(12) United States Patent
Endo et al.

(10) Patent No.: US 11,467,578 B2
(45) Date of Patent: Oct. 11, 2022

(54) MOVING OBJECT AND MOVEMENT SYSTEM

(71) Applicant: TOYOTA JIDOSHA KABUSHIKI KAISHA, Toyota (JP)

(72) Inventors: Masato Endo, Chofu (JP); Katsuhiko Yourou, Toyota (JP); Shunji Tateishi, Kasugai (JP); Nobukatsu Fujishita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 16/777,151

(22) Filed: Jan. 30, 2020

(65) Prior Publication Data

US 2020/0272151 A1 Aug. 27, 2020

(30) Foreign Application Priority Data

Feb. 26, 2019 (JP) .............................. JP2019-032962

(51) Int. Cl.
| | | |
|---|---|---|
| *G01C 22/00* | (2006.01) |
| *G05D 1/00* | (2006.01) |
| *G06Q 50/14* | (2012.01) |
| *B25J 9/16* | (2006.01) |
| *G06Q 50/28* | (2012.01) |
| *G06Q 50/30* | (2012.01) |

(52) U.S. Cl.
CPC .......... *G05D 1/0088* (2013.01); *B25J 9/1664* (2013.01); *G06Q 50/14* (2013.01); *G06Q 50/28* (2013.01); *G06Q 50/30* (2013.01)

(58) Field of Classification Search
CPC ..... G05D 1/0088; B25J 9/1664; G06Q 50/14; G06Q 50/28; G06Q 50/30
See application file for complete search history.

(56) References Cited

U.S. PATENT DOCUMENTS

2018/0111698 A1* 4/2018 Podnar ................... B64F 1/368
2020/0050199 A1* 2/2020 Park ........................ G06Q 50/28

FOREIGN PATENT DOCUMENTS

| DE | 102018215009 A1 * | 3/2020 | ........... G06Q 10/083 |
| JP | 08-166822 A | 6/1996 |
| JP | 2013-23363 A | 2/2013 |
| JP | 2014-205563 A | 10/2014 |

* cited by examiner

*Primary Examiner* — Adam M Alharbi
(74) *Attorney, Agent, or Firm* — Sughrue Mion, PLLC

(57) ABSTRACT

Provided is a moving object configured to move in an airport. The moving object includes a communication unit configured to acquire identification information of a user and second information acquisition means for acquiring information about a destination, to which baggage of the user is to be transported, from a server apparatus based on the identification information of the user. Furthermore, the moving object includes a control device for moving to the destination in a state where the baggage of the user is held.

9 Claims, 7 Drawing Sheets

FIG. 3
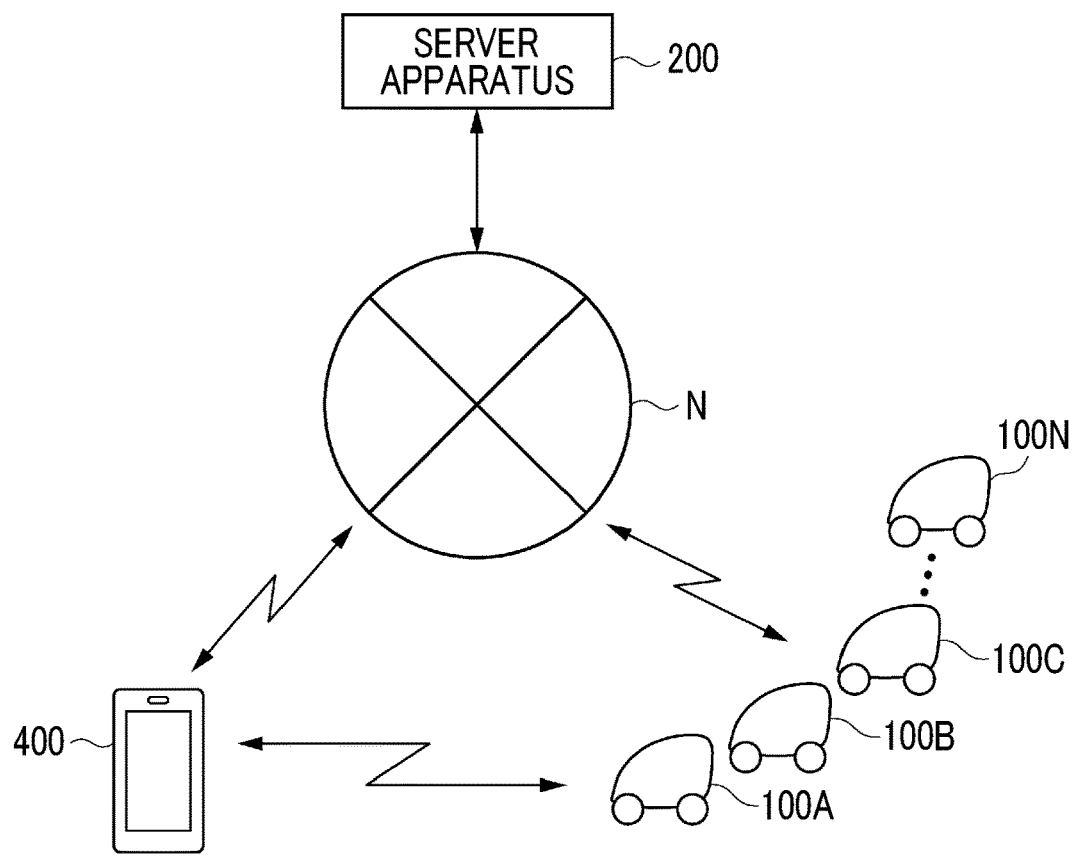
FIG. 4
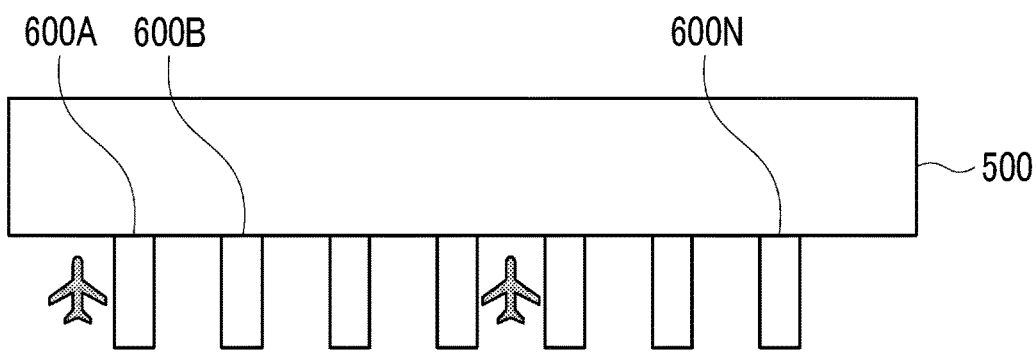

MOVING OBJECT AND MOVEMENT SYSTEM

INCORPORATION BY REFERENCE

The disclosure of Japanese Patent Application No. 2019-032962 filed on Feb. 26, 2019 including the specification, drawings and abstract is incorporated herein by reference in its entirety.

BACKGROUND

1. Technical Field

The disclosure relates to a moving object and a movement system.

2. Description of Related Art

In recent years, a moving object that moves together with a user and transports baggage of the user has been proposed. A user-following type moving robot device that follows a moving user while avoiding an obstacle and transports baggage or the like is described in Japanese Unexamined Patent Application Publication No. 8-166822 (JP 8-166822 A). In JP 8-166822 A, use of the moving robot device for transportation of a suitcase in an airport is described. In addition, an autonomously traveling suitcase that autonomously follows a user has also been put to practical use.

SUMMARY

However, the user-following type moving robot device described in JP 8-166822 A is merely configured to follow the user at all times. In addition, the user needs to equip a belt for the user to be detected by a sensor of the moving robot device. Therefore, it is difficult to say that means for movement conforming to an airport, in which a large number of unspecified persons are present, a high security level is secured, and various services are provided, is provided.

The disclosure provides a moving object and a movement system that are linked with a service provided in an airport and with which it is possible for a user to comfortably move in the airport.

A first aspect of the disclosure relates to a moving object configured to move in an airport. The moving object includes first information acquisition means for acquiring identification information of a user, second information acquisition means for acquiring information about a destination, to which baggage of the user is to be transported, based on the identification information of the user, and control means for generating a control signal for moving to the destination in a state where the baggage is held. Note that, the second information acquisition means may be configured to acquire the information about the destination based on information about an aircraft that the user is scheduled to board, the information about the aircraft being acquired based on the identification information of the user. Furthermore, the moving object may further include third information acquisition means for acquiring information about a time, until which the user needs to arrive at the destination, based on the identification information of the user. In addition, the control means may be configured such that the moving object can move based on autonomous driving.

The user may board the moving object and may move while holding the baggage and walking without boarding the moving object.

A second aspect of the disclosure relates to another moving object configured to move in an airport. The moving object includes first information acquisition means for acquiring identification information of a user, second information acquisition means for acquiring identification information of baggage purchased by the user in the airport, holding means for holding the baggage purchased by the user in the airport, third information acquisition means for acquiring information about a destination, to which the baggage is to be transported, based on the identification information of the user, control means for generating a control signal for moving to the destination in a state where the baggage is held, and output means for outputting the identification information of the user and the identification information of the baggage. The output means may be configured to output the identification information of the user and the identification information of the baggage to an inspection device for inspection of the baggage. Furthermore, the moving object may further include fourth information acquisition means for acquiring information about the result of authentication of the user and the baggage performed based on the identification information of the user and the identification information of the baggage, from the inspection device. The control means may be configured such that the moving object can pass through an inspection place in which the inspection device is installed based on the result of the authentication of the user and the baggage performed by the inspection device. The second information acquisition means may be configured to acquire the information about the destination based on information about an aircraft that the user is scheduled to board, the information about the aircraft being acquired based on the identification information of the user. The moving object may further include route determination means for determining a route that includes the inspection place as a waypoint, based on the destination. The second information acquisition means may be configured to acquire a destination that is set based on a landing region of the aircraft that the user is scheduled to board or the route determination means may be configured to determine a route that includes a cargo-compartment of the aircraft as a waypoint.

A third aspect of the disclosure relates to a movement system including a plurality of moving objects configured to move in an airport and control means for communicating with the moving objects. A server of the movement system includes first information acquisition means for acquiring the identification information of the user, second information acquisition means for acquiring position information set by the user, and means for outputting an order to move a position indicated by the position information to one moving object selected from the moving objects based on the identification information and the position information. Each of the moving objects includes control means for moving to a position set by means of the position information based on the order, third information acquisition means for acquiring the identification information of the user, holding means for holding baggage of the user, and control means for moving to a destination set by the user in a state where the user and the baggage are loaded. Here, the moving object may be configured as described above.

BRIEF DESCRIPTION OF THE DRAWINGS

Features, advantages, and technical and industrial significance of exemplary embodiments of the disclosure will be

FIG. 3 is a schematic configuration diagram of a movement system according to the embodiment;

FIG. 4 is a schematic diagram of a terminal building and boarding gates according to the embodiment;

DETAILED DESCRIPTION OF EMBODIMENTS

Figure 1:
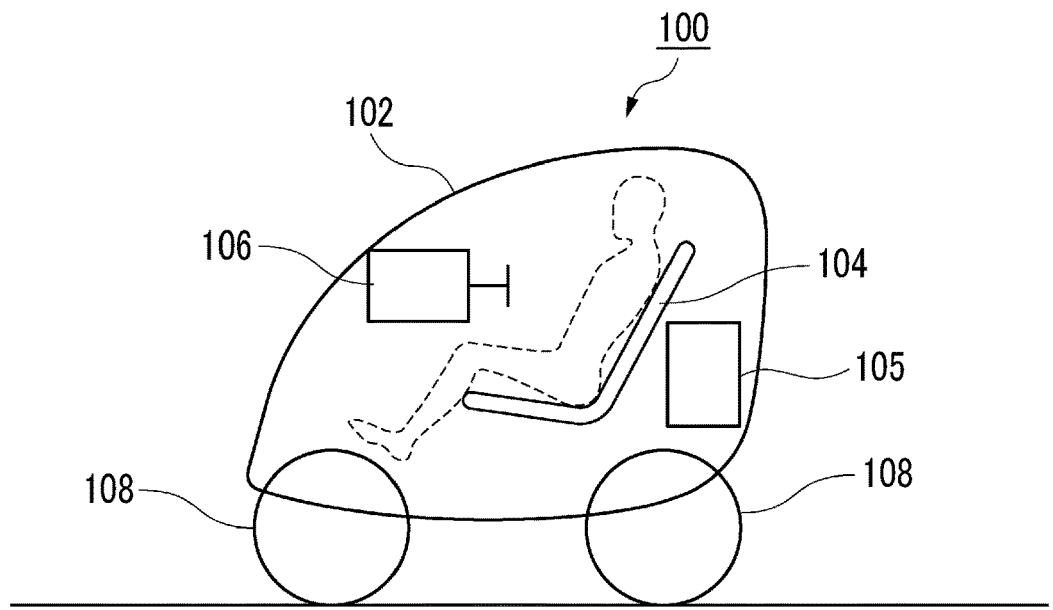
FIG. 1 is a view illustrating a schematic configuration of a moving object according to an embodiment.

Hereinafter, an embodiment of the disclosure will be described in detail with reference to drawings. The following embodiment is an example for describing the disclosure and is not to be used to limit the disclosure to the embodiment. Note that, constituent elements exhibiting same or similar functions are given the same reference numerals and repetitive description will be omitted.

FIG. 1 is a view illustrating a schematic configuration of a personal type moving object according to the present embodiment. A personal type moving object 100 according to the present embodiment is provided with, for example, a vehicle main body 102, a seat unit 104 that is attached to the vehicle main body 102 and that a driver or an occupant other than the driver sits on, an operation unit 106 provided with a steering wheel that the driver holds and with which the driver can drive the moving object 100, and a plurality of wheels 108 that rotates to move the vehicle main body 102. In addition, a baggage space unit 105 for storing baggage of an occupant is provided behind the seat unit 104.

The moving object 100 according to the present embodiment is, for example, a small size vehicle with a seat for one person or two persons and two wheels 108 are provided on a front side and one wheel 108 is provided on a rear side, for example. Movement of the moving object 100 may be controlled by a driver operating the moving object 100 and the moving object 100 may be configured such that the moving object 100 can be autonomously driven by switching to an autonomous driving mode.

Figure 2:
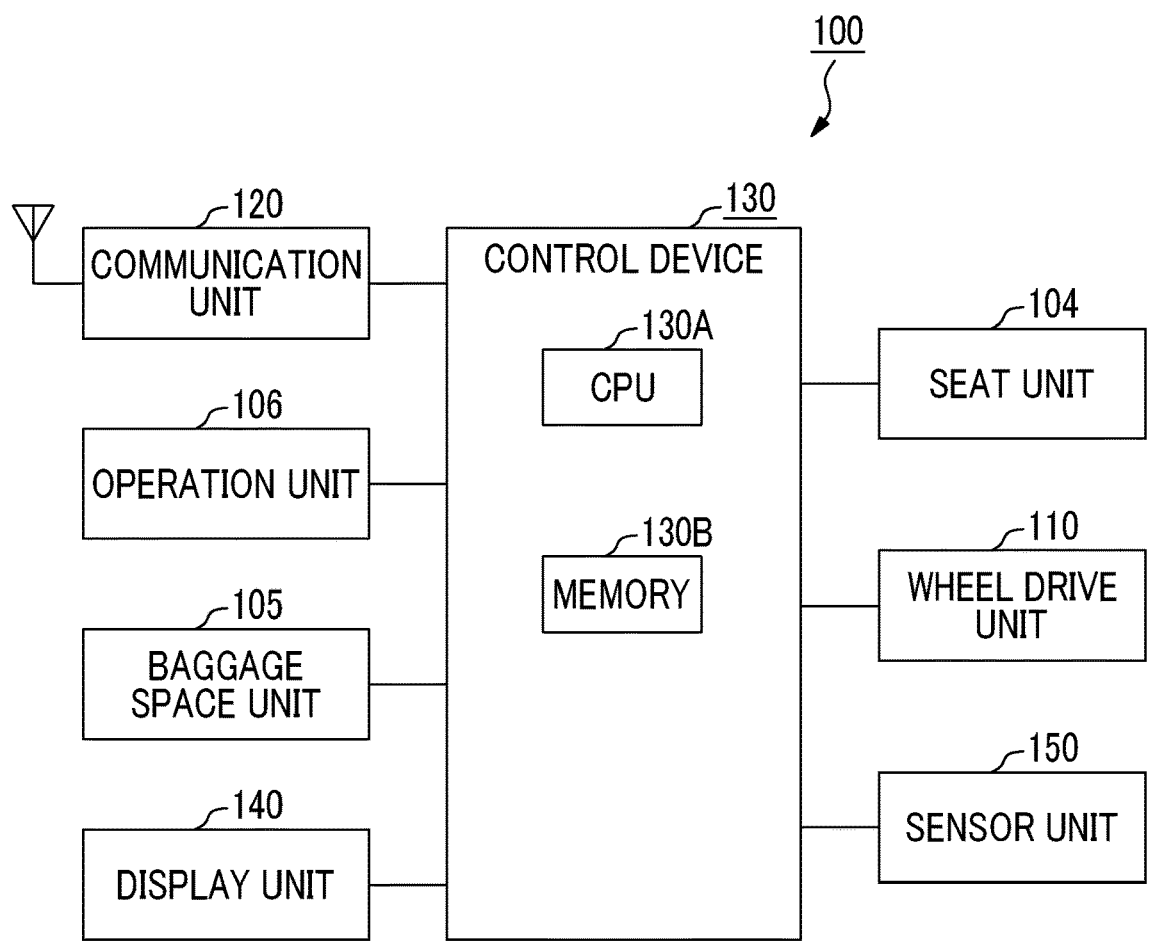
FIG. 2 is a block diagram illustrating a schematic system configuration of the moving object according to the embodiment.

FIG. 2 is a block diagram illustrating a schematic system configuration of the moving object 100 according to the present embodiment. The moving object 100 according to the present embodiment is provided with wheel drive units 110 that drives the wheels 108 respectively, the seat unit 104 that an occupant can sit on, the baggage space unit 105 that accommodates baggage of an occupant, a communication unit 120 that can communicate with an external device, the operation unit 106 with which an occupant can perform a driving operation, and a sensor unit 150 that is provided with various kinds of sensors and outputs information acquired from the sensors to a control device 130. In addition, the moving object 100 is provided with a display unit 140 that is provided with a liquid crystal display or the like that displays information that an occupant is to be notified of.

Each wheel drive unit 110 is provided with an electric motor and a brake built into the vehicle main body 102 and rotates the wheel 108 or changes the orientation of the wheel 108 based on control data received from the control device 130.

The seat unit 104 is provided with a seat on which an occupant sits. In addition, the baggage space unit 105 is provided with a baggage chamber for accommodation of baggage of an occupant and locks the baggage chamber such that the baggage chamber is not opened from the outside, based on control data received from the control device 130.

Figure 5:
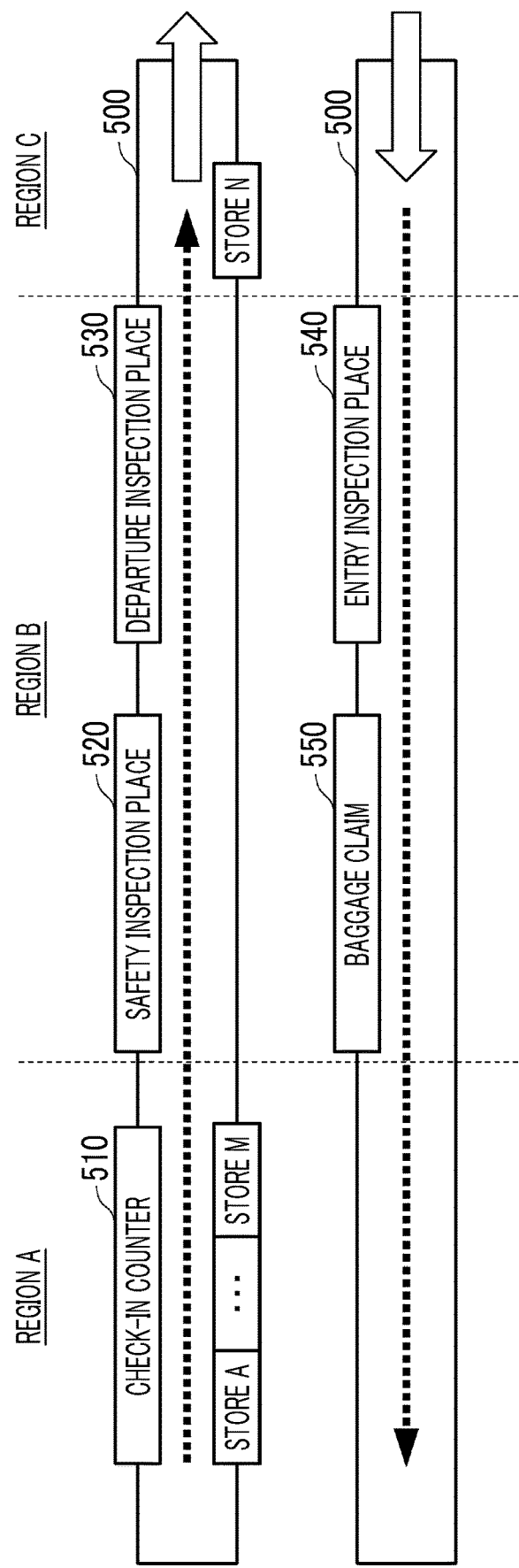
FIG. 5 is a schematic diagram illustrating equipment and facilities in the terminal building according to the embodiment.

The control device 130 (electronic control unit) is provided with a CPU 130A and a memory 130B and generates a control signal for controlling each unit in the moving object 100. The CPU 130A performs various kinds of calculation processes included in the disclosure and controls each unit in accordance with a command included in various kinds of computer programs such as firmware stored in a non-volatile semiconductor memory such as a flash memory provided in the memory 130B. A computer program for performing various kinds of calculation processes (including various kinds of calculation processes shown in flowchart in FIG. 6 or like) included in the disclosure, a computer program for performing a calculation process for controlling the wheel drive units 110 based on the operation unit 106, and a computer program for performing a calculation process for autonomously controlling the wheel drive units 110 based on information acquired from the communication unit 120 and the sensor unit 150 at the time of autonomous driving are recorded in the memory 130B. Furthermore, map data for a plurality of airports to which the moving object 100 may move is recorded in the memory 130B, the map data for the airports including map data for a terminal building 500 (FIG. 5) and boarding gates 600 (FIG. 5). The memory 130B further includes a cache memory composed of an SRAM, a DRAM, and the like temporarily storing data or the like of a calculation process performed by the CPU 130A.

The operation unit 106 is provided with the steering wheel with which a driver controls the direction in which the moving object 100 moves and is provided with an acceleration pedal and a brake pedal for operating the electric motors and the brakes installed in the wheel drive units 110. The control device 130 generates a control signal for controlling the electric motors and the brakes installed in the wheel drive units 110 based on information received from the operation unit 106 and outputs the control signal to the wheel drive units 110. Note that, a configuration in which a touch panel that the driver can operate or a mike that recognizes a voice of the driver with voice recognition processing software for a plurality of languages is installed as the operation unit 106 such that the moving object 100 can be operated based on a pressing operation on the touch panel performed by the driver or a voice of the driver may also be adopted.

The sensor unit 150 is provided with various kinds of sensors and outputs information that is needed when the control device 130 controls the moving object 100 to the control device 130. The sensors may include a plurality of cameras for capturing images of a space in front of the moving object 100 and a space behind the moving object 100, a LiDAR distance measurement system including a millimeter wave radar for avoiding collision with a pedestrian or the like, an infrared camera, and the like. The sensor unit 150 may be provided with a semiconductor IC for image processing that enables image recognition or the like and may be configured to recognize a lane on which the moving object 100 needs to travel or an obstacle such as a pedestrian from an image captured by a camera or the like and output the result of the recognition to the control device 130. Furthermore, the sensor unit 150 may estimate a current position from a marker for position measurement installed on a wall surface or the like in an airport or a periphery image and may output position information to the control device 130. Furthermore, the sensor unit 150 may be provided with a magnetic sensor for detecting a magnetic marker buried under a road surface on which the moving object 100 moves and may output information and information other than the position information (for example, information indicating stopping position or information indicating position where moving object 100 cannot proceed) to the control device 130. The control device 130 controls the wheel drive units 110 based on information received from the sensor unit 150 such that the moving object 100 stops at a position where the moving object 100 needs to stop or the moving object 100 is hindered from proceeding to a position where the moving object 100 cannot proceed. Therefore, even in a case where the moving object 100 is driven by a driver, the moving object 100 does not travel outside a predetermined region that is set in advance such that the moving object 100 can travel therein. Furthermore, the sensor unit 150 may be provided with a rotary encoder or the like for measuring the rotation rate or the like of the wheels 108 and may be configured to output speed information to the control device 130 and control the moving object 100 such that a predetermined speed is not exceeded.

The communication unit 120 is provided with means for transmitting and receiving information to and from a server apparatus 200 in the airport, various kinds of facilities in the airport, and a user of the moving object 100. For example, the communication unit 120 is provided with a plurality of communication means such as NFC (near field wireless communication system formulated by NFC forum) and WiFi (wireless communication system based on 802.11 standard formulated by IEEE) for transmitting and receiving information to and from a portable information terminal held by the user. Furthermore, the communication unit 120 may be provided with a device for recognition of an image or the like (for example, barcode reader that reads two-dimensional barcode or like shown on airplane ticket held by user). In addition, the communication unit 120 may be configured to acquire position information from the GPS or the like and output the position information to the control device 130.

FIG. 3 is a schematic configuration diagram of a movement system 300 according to the present embodiment. The movement system 300 is provided with a plurality of the moving objects 100 and the server apparatus 200 that can transmit and receive to and from information each moving object 100 via a network N. Hereinafter, reference numerals "100A", "100B", or the like will be used to refer to a specific moving object and a reference numeral "100" will be simply used to collectively refer to all the moving objects 100. At least a part of the network N may be the Internet or a dedicated local area network (LAN).

Furthermore, the server apparatus 200 can transmit and receive information to and from a portable information terminal 400 held by a user of the movement system 300 via the network N. Application software for using the movement system 300 is installed in the portable information terminal 400 and the user can cause the calculation processes disclosed in the disclosure to be performed by activating the application software.

Furthermore, the moving objects 100 can transmit and receive information to and from the portable information terminal 400 via the network N or directly. For example, the moving objects 100 may be configured to directly communicate with the portable information terminal 400 not via the network N in the ad-hoc mode defined by the 802.11 standard.

FIG. 4 illustrates the terminal building 500 of the airport in which the moving objects 100 move. As shown in the drawing, a plurality of boarding gates 600A to 600N for boarding airplanes and alighting from the airplanes is provided while being connected to the terminal building 500. Hereinafter, reference numerals "600A", "600B", or the like will be used to refer to a specific boarding gate and a reference numeral "600" will be simply used to collectively refer to all the boarding gates. The boarding gates 600 may be provided while being separated from the terminal building 500. In addition, a plurality of the terminal buildings 500 may be provided.

FIG. 5 is a schematic diagram illustrating equipment and facilities in the terminal building 500. In the terminal building 500, a check-in counter 510 where passengers including the user of the movement system 300 perform check-in is provided. A passenger can receive an airplane ticket or leave baggage with an airline company at the check-in counter 510. The checked hand baggage left with the airline company is transported by a belt conveyor or the like after being inspected by means of an X-ray inspection device or the like in the vicinity of the check-in counter 510. Thereafter, the package is transported by an airport staff into a cargo-compartment of an aircraft that the passenger is scheduled to board.

In the terminal building 500, a safety inspection place 520 is provided. In principle, identification cards such as passports and boarding tickets of all passengers including the user of the movement system 300 are checked and the passengers and hand baggage to be brought into an aircraft are inspected by means of a metal detector, an X-ray inspection device, and the like. The metal detector can inspect presence or absence of metal carried by a passenger by means of electromagnetic induction or the like, for example. As an inspection device, an explosive inspection device, a liquid inspection device, or the like may be provided.

Furthermore, a departure inspection place 530 is provided in the terminal building 500 for international flights. A passenger who has passed through the departure inspection place 530 can board an aircraft that the passenger is scheduled to board at the boarding gate 600 where the aircraft stands by.

On the contrary, a passenger who has got off an aircraft can finish an arrival procedure by passing through the boarding gates 600 and an entry inspection place 540 and receiving checked hand baggage at a baggage claim 550.

As described above, a facility including the terminal building 500 and the boarding gates 600 is divided into a region A (FIG. 5) as a first region that all of users of the airport can enter, that is provided with the check-in counter 510 or the like, and that is defined by the safety inspection place 520, a region B (FIG. 5) from the safety inspection place 520 to the departure inspection place 530, and a region C (FIG. 5) starting from the departure inspection place 530 in which the boarding gates 600 are provided. In addition, a plurality of stores is provided at least in the region A that all the airport users can enter and the region C that is provided with the boarding gates 600 and at which passengers need to standby until the time of boarding.

In the wide facility including the terminal building 500 and the boarding gate 600 as described above, airport users including passengers may purchase products such as souvenirs in the stores at a standby time until the time of boarding or the like. The fact of being able to receive a tax exemption, desire to use up foreign currency, and the like increase purchase intention. Meanwhile, a physical burden caused due to a fact that there is a need to walk while holding a product in the wide facility, and a mental burden caused due to a fact that there is a need to be subjected to an inspection at the safety inspection place 520 or the like decrease purchase intention. Furthermore, restrictions on the size and the weight of hand baggage that can be brought into the aircraft also contribute to a hesitation in purchasing products.

The moving objects 100 and the movement system 300 according to the present embodiment are to reduce such burdens and to be preferably used in the airport. Hereinafter, a procedure in which a user uses the moving object 100 in the movement system 300 will be described.

Figure 6:
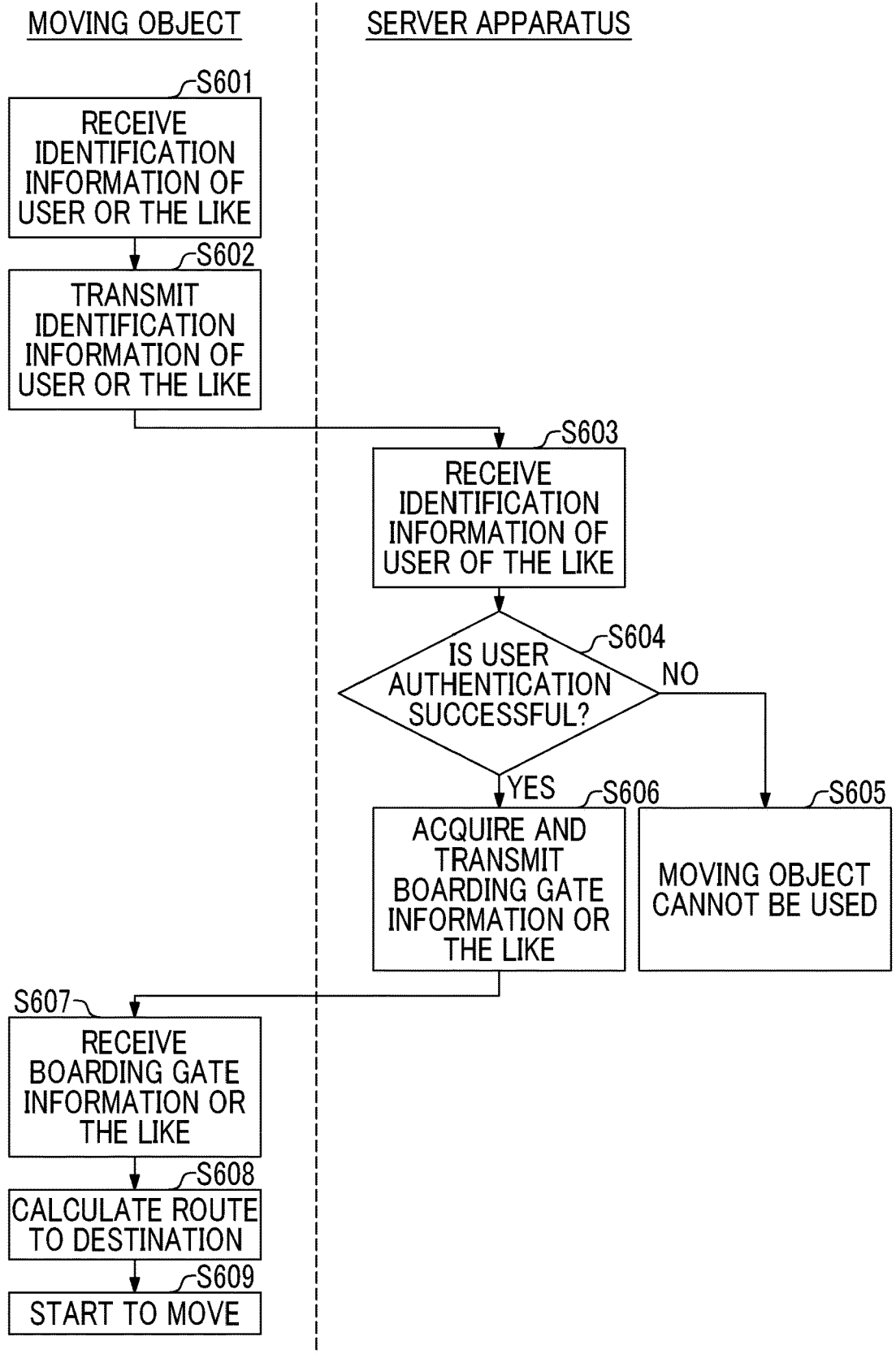
FIG. 6 is a flowchart illustrating a method of using the moving object according to the embodiment.

FIG. 6 is a flowchart illustrating the way in which the moving object 100 according to the present embodiment is used. In the present embodiment, a user approaches any one moving object 100A out of the moving objects 100 standing by at the vicinity of an entrance of the terminal building 500 and holds a two-dimensional barcode of an electronic aircraft ticket displayed on the portable information terminal 400 possessed by the user over a barcode reader of the communication unit 120 of the moving object 100A. The two-dimensional barcode includes identification information of the user and identification information of an aircraft that the user is scheduled to board. The moving object 100A receives the identification information of the user and the identification information for specifying the aircraft that the user is scheduled to board (step S601).

Next, the communication unit 120 of the moving object 100A transmits the information received from the barcode reader and information for identification of the moving object 100A that is recorded in the memory 130B in advance to the server apparatus 200 via the network N such as a wireless LAN by means of wireless communication means such as WiFi, for example (step S602).

When the server apparatus 200 receives the identification information of the user, the identification information of the aircraft that the user is scheduled to board, and the identification information of the moving object 100A from the moving object 100A (step S603), the server apparatus 200 performs authentication relating to whether a person specified by the received identification information is registered in a database provided in the server apparatus 200 as a person who can use moving object 100A, by using the database (step S604).

In a case where the authentication is not successful, the moving object 100A is notified that the user cannot use the moving object 100A (step S605).

In a case where the authentication is successful, the server apparatus 200 acquires information specifying the boarding gate 600A at which the aircraft that the user is scheduled to board stands by and information specifying the scheduled boarding time of the aircraft until which the user needs to board the aircraft, the scheduled departure time of the aircraft, and the scheduled landing point of the aircraft from the database and transmits the information to the moving object 100A (step S606). Furthermore, the server apparatus 200 registers a fact that the user is using the moving object 100A in the database.

When the moving object 100A receives the information via the network N, the moving object 100A transitions into a state where the moving object 100A receives an operation on the moving object 100A that is performed by the user (step S607). In addition, the control device 130 causes the display unit 140 of the moving object 100A to display that the moving object 100A can be used by the user. Furthermore, the control device 130 causes the display unit 140 to display the information for specifying the boarding gate 600A, the scheduled boarding time of the aircraft until which the user needs to board the aircraft, the scheduled departure time of the aircraft, and the scheduled landing point of the aircraft received from the server apparatus 200. Therefore, even in a case where there is a change in boarding gate 600 or scheduled boarding time, the user can easily check the change with the display unit 140. The user can unlock the baggage space unit 105 by using the operation unit 106 and can lock the baggage space unit 105 after storing the baggage in the baggage space unit 105.

Furthermore, the control device 130 of the moving object 100A can calculate a route to reach the boarding gate 600A from a current location via the safety inspection place 520 and the departure inspection place 530 as waypoints, based on current position information of the moving object 100A that is acquired from the sensor unit 150, the information specifying the boarding gate 600A that is received from the server apparatus 200, and map information for the terminal building 500 that is recorded in the memory 130B. Note that, the map information includes information specifying a region in which the moving object 100A can travel and the control device 130 determines a route such that the moving object 100A travels within the region (step S608).

Based on an operation on the operation unit 106 that is performed by the user, the moving object 100A starts to move (step S609). The user may drive the moving object 100A by himself or herself by using the steering wheel or the like of the operation unit 106 and may switch to the autonomous driving mode such that the moving object 100A autonomously travels. The moving object 100A causes the display unit 140 to display route guidance information for showing the route.

Figure 7:
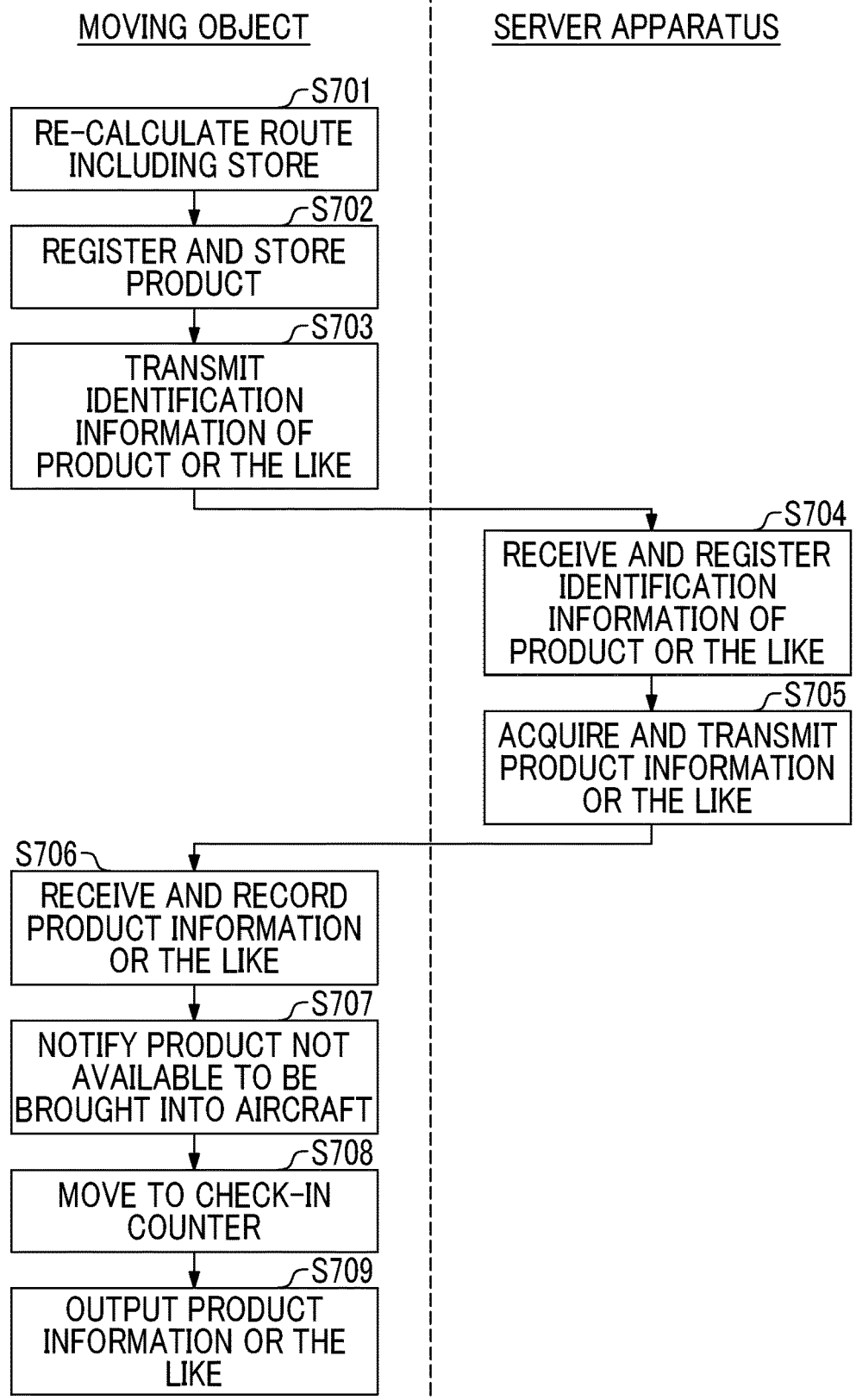
FIG. 7 is a flowchart illustrating a method of transporting a purchased product by means of the moving object according to the embodiment.

FIG. 7 is a flowchart illustrating steps for purchasing products at one store or a plurality of stores provided in the region A before the safety inspection place 520 after staring to move. The user in the moving object 100A can cause the display unit 140 to display map information for the stores. The user can select a store displayed on the display unit 140 by using a touch panel or the like of the operation unit 106. When a predetermined store is selected, the control device 130 of the moving object 100A re-calculates and determines a route including the store as a waypoint (step S701).

After the user arrives at the store, the user can purchase a product by himself or herself and can store the purchased product into the baggage space unit 105. At this time, information for identification of the purchased product may be received by the moving object 100 by means of the barcode reader or the like of the communication unit 120 such that the information is recorded in the memory 130B (step S702). The communication unit 120 of the moving object 100A can transmit identification information of one product or a plurality of products stored in the baggage space unit 105 and identification information of the moving object 100A to the server apparatus 200 via the network N (step S703). When the server apparatus 200 receives the identification information of the product or the like from the moving object 100A, the server apparatus 200 registers the identification information of the product or the like in the database in correlation with the moving object 100A (step S704).

The server apparatus 200 is provided with a database relating to products sold in the airport including the terminal building 500 and the boarding gates 600 in advance. Therefore, it is possible to check whether the identification information of the product transmitted from the moving object 100A is identification information of a safe product sold in the airport or not. Furthermore, it is possible to acquire product information such as the weight, the size, or the like of the product from the database and to acquire the status of the user of the moving object 100A and user destination information. Therefore, it is possible to determine whether or not a total weight exceeds a predetermined weight limit relating to checked hand baggage or hand-carry baggage or calculate a weight until the limit is reached based on the status of the user and transmit the result of the determination or the calculation to the moving object 100A along with the product information such as the weight, the size, or the like of the product (step S705). Furthermore, a configuration in which determination about a possibility that the product is brought to a destination and presence or absence of tariffs is performed based on the user destination information and the result of the determination is transmitted to the moving object 100A may also be adopted. Note that, a configuration in which a gravimeter is installed in the baggage space unit 105 and the total weight of a product stored in the baggage space unit 105 and a product stored in a storage chamber by the user is transmitted to the server apparatus 200 may also be adopted.

When the control device 130 of the moving object 100A receives the product information relating to the weight or the like of each product that becomes baggage of the user, the control device 130 records the product information in the memory 130B (step S706). Furthermore, the control device 130 may be configured such that information about baggage (for example, baggage such as suitcase brought by user, product X purchased by user in airport, and product Y purchased by user in airport) stored in the baggage space unit 105 and the total weight (or weight of each item) of the baggage can be displayed on the display unit 140 in response to a request.

The control device 130 of the moving object 100A can compare a list of products not allowed to be brought into the aircraft, which is recorded in the memory 130B in advance, with baggage in the baggage space unit 105, cause the display unit 140 to perform a warning displaying operation to the effect that a product not allowed to be brought into the aircraft (for example, blade such as scissors and knife and product that can be weapon like golf club) is present (step S707) in a case where such a product is present, and cause the display unit 140 to perform a displaying operation of suggesting checking baggage at the check-in counter 510 in a case where the baggage can be checked as checked hand baggage. Note that, a configuration in which the moving object 100A automatically moves to the check-in counter 510 in such a case may also be adopted.

Thereafter, the user can cause the moving object 100A to move to the check-in counter 510 and check a part or all of the baggage of the user as needed (step S708). At the check-in counter 510, the user can extract large-size baggage such as a suitcase or a product that cannot be brought into the aircraft as hand baggage from the baggage stored in the baggage space unit 105 and check the large-size baggage or the product at the check-in counter 510.

Here, the control device 130 of the moving object 100A may output the identification information of the user of the moving object 100A and information about the product stored in the baggage space unit 105 (contents, weight, identification information, or like of product) to the display unit 140 and cause the display unit 140 to display the identification information and the information about the product (step S709). As a result, an airport staff can easily confirm that a product can be transported into a cargo-compartment of the aircraft as checked hand baggage as long as the product is a product purchased in the airport. In addition, a configuration in which identification information, weight information, or the like of a product is transmitted to the server apparatus 200 via the communication unit 120 may also be adopted. Even in the case of such a configuration, it is possible to acquire information about checked hand baggage by acquiring information that is needed from the server apparatus 200 by means of an information terminal of the check-in counter 510. Note that, the user can perform check-in at the check-in counter 510. However, the movement system 300 according to the present embodiment may be provided while being linked with an airline company such that check-in is automatically performed at the time of the authentication in step S604 and actions other than checking baggage are not performed at the check-in counter 510, for example. The baggage checked at the check-in counter 510 is transported into the cargo-compartment of the aircraft as checked hand baggage.

Figure 8:
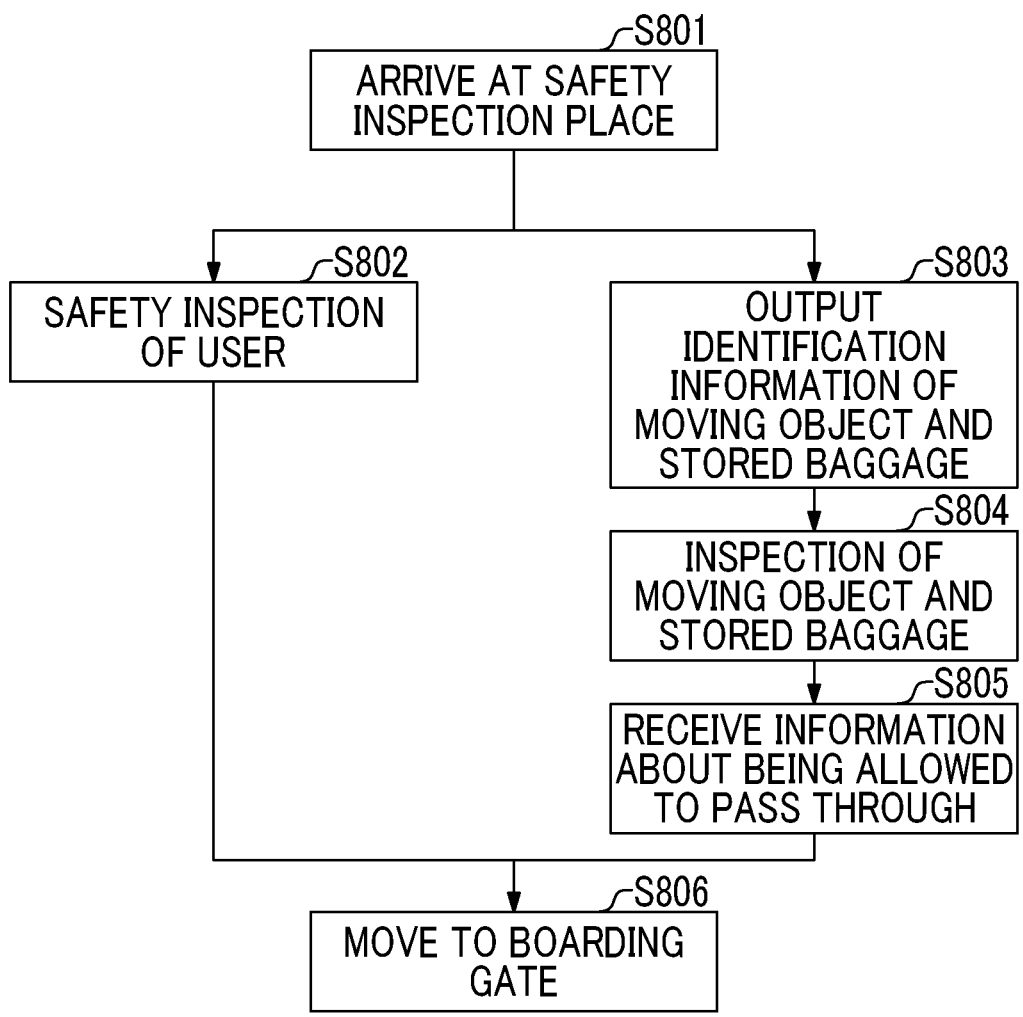
FIG. 8 is a flowchart illustrating a method of safety inspection according to the embodiment.

Thereafter, the user can move to the safety inspection place 520 in a case where hand-carry baggage is stored in the baggage space unit 105 solely. FIG. 8 is a flowchart illustrating an inspection procedure in the safety inspection place 520.

When the user arrives at the safety inspection place 520 (step S801), the user gets off the moving object 100A while holding the hand-carry baggage such as a handbag that is brought by the user and is subjected to safety inspection performed by means of the metal detector or the like (step S802).

Meanwhile, the moving object 100A switches to the autonomous driving mode and is subjected to inspection at the safety inspection place 520. First, the control device 130 of the moving object 100A reads the identification information of the moving object 100A which is recorded in the memory 130B, the identification information of the user of the moving object 100A, and the product information of the baggage stored in the baggage space unit 105 and transmits the identification information and the product information to an inspection device (including information terminal used by airport staff at time of inspection) in the safety inspection place by using the communication unit 120 (step S803). Note that, the information may be transmitted to the inspection device via the server apparatus 200. In addition, a configuration in which the identification information of the moving object 100A or the identification information of the user is solely transmitted and the server apparatus 200 acquires the product information or the like and transmits the product information or the like to the inspection device may also be adopted. Furthermore, a camera that images the inside of the baggage space unit 105 may be installed in the moving object 100 such that the camera captures an image of the inside of the baggage space unit 105 at the safety inspection place 520 and transmits the image to the inspection device.

An airport staff inspects the moving object 100A and the baggage in the baggage space unit 105 by using the product information or the like received by the inspection device (step S804). In the case of such a configuration, it is possible to easily confirm the safety of the moving object 100A and a product in the baggage stored in the baggage space unit 105 that is purchased in the airport. Particularly, in a case where the baggage stored in the baggage space unit 105 is solely the product purchased in the airport, it is possible to omit unlocking and opening the baggage space unit 105 and inspecting the inside of the baggage space unit 105. Note that, in a case where it is possible to confirm the safety of the user by other means like the case of a user with physical disabilities, the user may be subjected to inspection while being in the moving object 100A. In a case where the safety of the moving object 100A and the baggage stored in the baggage space unit 105 is confirmed, the inspection device transmits information indicating that the moving object 100A is allowed to pass through the safety inspection place 520 such as information indicating the result of the inspection to the moving object 100A directly or via the server apparatus 200.

When the moving object 100A receives the information indicating that the moving object 100A is allowed to pass through the safety inspection place 520, the moving object 100A restarts to move while being autonomously driven and passes through the safety inspection place 520 (step S805).

After the user passes through the safety inspection place 520, the user passes through the departure inspection place 530 alone or after returning to the moving object 100A and moves to the predetermined boarding gate 600A. Even in a case where the user walks to the predetermined boarding gate 600A alone, since the moving object 100A acquires information about the predetermined boarding gate 600A as a destination, the moving object 100A can move to a predetermined standby position in the vicinity of the boarding gate 600A while being autonomously driven (step S806).

As described above, with the movement system 300 and the moving objects 100 according to the present embodiment, it is possible to cause the moving objects 100 to carry a product purchased in the airport. Therefore, the user can comfortably move in the airport without carrying baggage. A service provider can increase the purchase intention of the user by providing a service using the movement system 300 or the like. In addition, it is possible to differentiate a service by limiting a person who can use the moving objects 100 to a person of a predetermined status.

In addition, since it is possible to acquire information about a boarding gate for an aircraft that a user is scheduled to board and a boarding time from the server apparatus 200 based on identification information of the user, it is possible to move without straying and to arrive at the boarding gate in a timely manner even in a wide facility. For example, a configuration in which a time expected to be taken to reach a boarding gate from a current location is calculated based on a boarding time and position information of the boarding gate and a user is notified when a time to start to move is reached may also be adopted. In addition, even in a case where there is a sudden change in boarding gate, boarding time, or the like, it is possible to easily cope with the change by receiving information about the change from the server apparatus 200. In addition, since the moving objects 100 can record identification information of a product purchased in the airport and output the identification information, it is possible to simplify safety inspection by causing an inspection device (including information terminal used for inspection) to receive the identification information of the product directly or via the server apparatus 200 or it is possible to omit inspection by excluding the product from inspection targets. In addition, since it is possible to acquire information about a product purchased in the airport by means of the server apparatus 200, it is possible to easily determine whether the product can be brought into an airport as hand-carry baggage and whether to check the product as checked hand baggage. In addition, since it is also possible to acquire information about the weight of a product, it is possible to prompt purchasing a product in consideration of a weight limit. Furthermore, it is also possible to provide information based on status information obtained from identification information of a user.

Note that, in step S702, the user does not need to store the purchased product into the baggage space unit 105 of the moving object 100 by himself or herself. An airport staff working at a store may store a product designated by the user. In this case, a configuration in which identification information is assigned to the airport staff and information indicating that use of the moving object 100 is allowed is registered in the database of the server apparatus 200 in correlation with the identification information may also be adopted. After the user designates a product to purchase by using the portable information terminal 400 or the like, the user may move while being separated from the moving object 100. The airport staff can store the designated product in the moving object 100 in accordance with an instruction of the user and cause the moving object 100 to move to the check-in counter 510 while being autonomously driven. When an airport staff in the check-in counter 510 is registered in the database of the server apparatus 200 such that the airport staff can use the moving object 100, the airport staff can extract baggage in the baggage space unit 105 of the moving object 100 and take charge of the baggage as checked hand baggage.

Note that, a configuration in which information registered in the database of the server apparatus 200 is periodically recorded in the memory 130B of the moving object 100 and updated such that authentication by means of direct communication between an airport staff and the moving object 100 can be performed may also be adopted. The user can receive the checked hand baggage at a baggage claim in a destination airport, for example. Settlement for the product purchased in the airport may be finished when receiving the checked hand baggage is finished.

In addition, in steps S601 to S602, the moving object 100 may receive the identification information of the user solely and transmit the identification information to the server apparatus 200. The server apparatus 200 may be configured to acquire information about the aircraft that the user is scheduled to board based on the identification information of the user. In addition, in a case where a difference between the time of the determination in step S604 and the departure time of the aircraft that the user is scheduled to board is equal to or greater than a predetermined time, the user may not be allowed to use the moving object 100. In addition, it is a matter of course that various kinds of methods other than the barcode reader can be used for identification information. For example, identification information may be received with a passport scanned by a scanner of the moving object 100. In addition, the server apparatus 200 may be configured to transmit information after a change to each moving object 100 each time there is a change in aircraft flight information.

Modification Example 1

Figure 9:
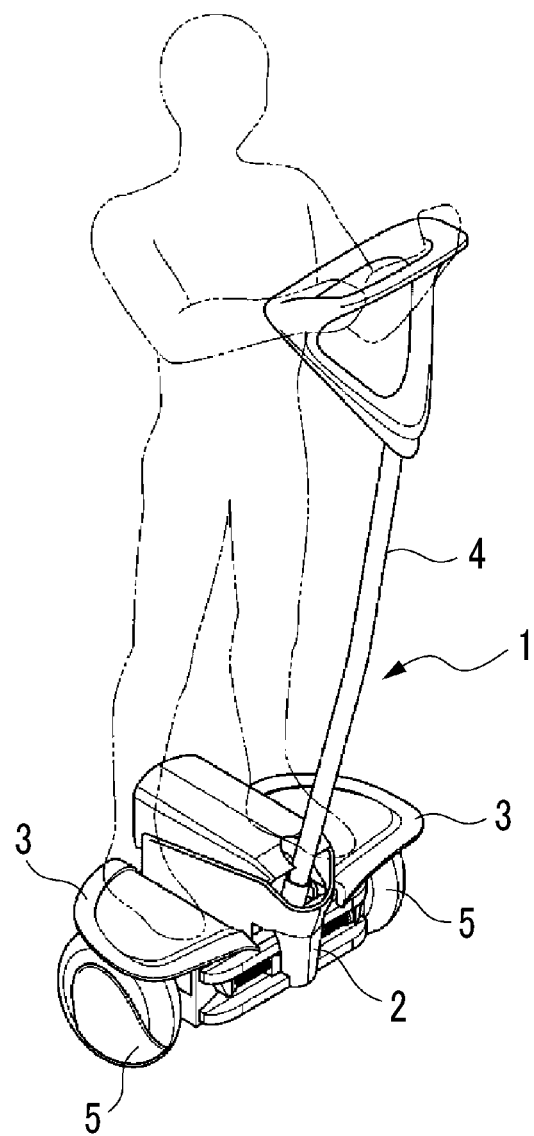
FIG. 9 is a perspective view illustrating a schematic configuration of a moving object according to a modification example.

FIG. 9 is a perspective view illustrating a schematic configuration of an inverted type moving object 1 according to a modification example. The disclosure may be applied to a moving object 1 as shown in FIG. 9. In addition, the moving object 100 and the moving object 1 may be used together with each other.

The inverted type moving object 1 is provided with, for example, a vehicle main body 2, a pair of right and left step portions 3 that is attached to the vehicle main body 2 and with which an occupant boards the moving object 1, an operation handle 4 that is tiltably attached to the vehicle main body 2 and that the occupant holds, and a pair of right and left drive wheels 5 that is rotatably attached to the vehicle main body 2. The inverted type moving object 1 is configured as a coaxial two-wheel vehicle of which the drive wheels 5 are disposed to be coaxial with each other and which travels while maintaining an inverted state, for example. The inverted type moving object 1 is configured to move forward and backward when the centroid of the occupant is moved forward and backward such that the step portions 3 of the vehicle main body 2 are inclined forward and backward and is configured to turn right and left when the centroid of the occupant is moved rightward and leftward such that the step portions 3 of the vehicle main body 2 are inclined rightward and leftward. In addition, in the vehicle main body 2 below the step portions 3, a baggage space unit that can accommodate and hold baggage of a user like a suitcase is provided. Note that, each step portion 3 may be provided at higher positions than illustrated in the drawing such that an accommodation space in the baggage space unit is expanded. In addition, as the inverted type moving object 1, the coaxial two-wheel vehicle as described above is applied. However, the disclosure is not limited thereto and can be applied to any moving object that travels while maintaining an inverted state. For example, a moving object of which the size is approximately the same as that of a general suitcase may also be adopted.

Such a moving object 1 can be realized by using wheel drive units provided with electric motors that drive the drive wheels 5, a posture sensor that detects the posture of the vehicle main body 2, a pair of rotation sensors that detects rotation information of the drive wheels 5, a control device that controls the wheel drive units, and a battery that supplies electrical power to the wheel drive units and the control device. In addition, by providing the same configurations as those of the seat unit 104, the baggage space unit 105, the operation unit 106, the communication unit 120, the control device 130, and the display unit 140 as shown in FIG. 2, it is possible to provide a moving object that is linked with a service provided in an airport and with which a user can comfortably move in the airport.

Note that, such a moving object 1 may be provided with a lockable and detachable accommodation box for storing baggage of a user instead of the step portions 3 such that the moving object 1 is used as a moving object dedicated for baggage transportation. When the moving object 1 is caused to autonomously travel to follow a user instead of traveling along a dedicated lane, the user can freely purchase a product while moving in an airport with empty hands. Therefore, even in the case of a heavy product such as a household electric appliance or an alcoholic beverage, there is no decrease in purchase intention. Therefore, the value of an airport is increased such that the airport is used by a larger number of passengers. The moving object 1 may be configured to transport baggage to a position designated by a user even in a case where the designated position is not in the vicinity of a boarding gate or a safety inspection place.

Modification Example 2

In the above-described embodiment, a person who wants to use a moving object such as the moving object 100 or the moving object 1 approaches the moving object and starts to use the moving object after authentication. However, the disclosure is not limited to this. For example, the disclosure may be applied such that a moving object automatically moves toward a user when the user entering an airport is detected.

For example, a configuration in which a moving object moves to the vicinity of a car driven by a user when a number plate of the car is read and the car parked in a parking lot of an airport is detected may also be adopted. In the case of such a configuration, the user does not need to carry heavy baggage such as a suitcase by himself or herself immediately after arriving at the airport. Such a service can be realized when a number plate of the user is registered in the database of the server apparatus 200 or the like in advance.

In addition, a user may request the server apparatus to provide a moving object. For example, a configuration in which position information of an information terminal of the user and a request for provision of a moving object are transmitted to the server apparatus 200 via application software installed in the information terminal of the user may also be adopted.

The nearest station to an airport or the like may be provided with a station where a plurality of moving objects stand by. The station may be provided with charging equipment for charging the moving objects.

Modification Example 3

In the above-described embodiment, a moving object such as the moving object 100 or the moving object 1 moves in a predetermined area in an airport that is set in advance or moves to follow a user. However, the disclosure is not limited thereto. For example, a moving object to which the disclosure is applied can be used to move between terminal buildings in a wide airport including a plurality of terminal buildings.

In the case of the related art, an electric railcar or a transit bus is used to move between terminal buildings. However, in this case, wasteful time is generated due to waiting time. In addition, the electric railcar or the transit bus may make a detour without moving to a destination directly. Meanwhile, by moving between terminal buildings by using a moving object to which the disclosure is applied, it is possible to move to a boarding gate without loss. Since a moving object terminal has map data, it is possible to travel the shortest distance from the current location to the boarding gate. In addition, a server apparatus such as the server apparatus 200 can detect that a predetermined user has started to use a moving object by receiving identification information of the user from the moving object. An airport staff can receive the information indicating that the user has started to use the moving object from the server apparatus. Therefore, the airport staff can grasp that the user who is scheduled to board an aircraft is moving toward a boarding gate and take an appropriate action.

In addition, in a case where a destination airport is provided with a movement system similar to the movement system 300, the moving object may be accommodated in a cargo-compartment of an aircraft that a user boards such that the moving object is moved to the destination airport and standby at a baggage claim similar to the baggage claim 550 in the destination airport. In this case, the moving object travels along a route of which waypoints are the check-in counter 510 and the cargo-compartment of the airplane that the user is scheduled to board and the destination is the baggage claim in the destination airport. Specifically, the moving object accommodating baggage is handled as a type of baggage at the check-in counter 510, is transported by means of a belt conveyor as with other baggage, and is moved into the cargo-compartment of the aircraft. Thereafter, the moving object can reach the baggage claim by being handled in the same manner as other baggage at the destination airport. Note that, the moving object may autonomously travel along some routes. In addition, the user may register a destination in advance such that the moving object moves to another place (for example, accommodation facility such as hotel attached to destination airport, taxi stand in airport). In the case of such a configuration, there is a decrease in risk of lost baggage since the moving object transmits current position information to a server apparatus of the destination airport. Note that, in a case where baggage to be carried by the moving object includes a product or the like on which a tariff or the like is imposed, the portable information terminal 400 of the user may be notified to that effect. Since the moving object can output identification information of the moving object, the server apparatus can confirm the safety of the moving object. In addition, the safety of the baggage carried by the moving object can also be confirmed in the same manner with identification information of the baggage or the like being output. Therefore, it is possible to handle the moving object carrying the baggage as a type of baggage of which the safety has been confirmed.

Note that, the disclosure can be modified in various ways without departing from the sprit thereof. For example, some constituent elements in a certain embodiment can be added to another embodiment within the scope of creativity normal for those skilled in the art. In addition, some constituent elements in a certain embodiment can be substituted with corresponding constituent elements in another embodiment.

What is claimed is:

1. A moving object configured to move in an airport, the moving object comprising:
    an electronic control unit configured to
    acquire identification information of a user,
    acquire information about a destination to which baggage of the user is to be transported, based on the identification information of the user,
    calculate a route for moving to the destination in a state where the baggage is held, and
    generate a control signal for moving to the destination in a state where the baggage is held; and
    a display configured to display map information for stores in the airport, wherein
    the electronic control unit is configured to, in response to the user's selecting a specific store that is included in the stores displayed on the display, determine a route including the specific store as a waypoint.

2. The moving object according to claim 1, wherein the electronic control unit is configured to acquire the information about the destination based on information about an aircraft that the user is scheduled to board, the information about the aircraft being acquired based on the identification information of the user.

3. The moving object according to claim 2, wherein the electronic control unit is configured to acquire information about a time until which the user needs to arrive at the destination, based on the identification information of the user.

4. A moving object configured to move in an airport, the moving object comprising:
    an electronic control unit configured to
    acquire identification information of a user,
    acquire identification information of baggage purchased by the user in the airport,
    acquire information about a destination to which the baggage is to be transported, based on the identification information of the user,
    calculate a route for moving to the destination in a state where the baggage is held, and
    generate a control signal for moving to the destination in a state where the baggage is held;
    a display configured to display map information for stores in the airport; and
    a transmitter configured to output the identification information of the user and the identification information of the baggage, wherein
    the electronic control unit is configured to, in response to the user's selecting a specific store that is included in the stores displayed on the display, determine a route including the specific store as a waypoint.

5. The moving object according to claim 4, wherein the transmitter is configured to output the identification information of the user and the identification information of the baggage to an inspection device for inspection of the baggage.

6. The moving object according to claim 5, wherein the electronic control unit is configured to:
    acquire the information about the destination based on information about an aircraft that the user is scheduled to board, the information about the aircraft being acquired based on the identification information of the user; and
    determine a route to the destination of which a waypoint is an inspection place in which the inspection device is provided.

7. The moving object according to claim 6, wherein the electronic control unit is configured to:
    acquire the information about the destination based on information about a scheduled landing point of the aircraft that the user is scheduled to board; and
    determine a route that includes a cargo-compartment of the aircraft as a waypoint.

8. A movement system comprising:
    a server apparatus; and
    a plurality of the moving objects according to claim 1, wherein
    the server apparatus is configured to
    acquire identification information of the user,
    acquire information about an aircraft that the user is scheduled to board based on the identification information, and
    perform authentication relating to use of the moving object performed by the user.

9. A movement system comprising:
    a server apparatus; and
    a plurality of the moving objects according to claim 4, wherein the server apparatus is configured to
    acquire identification information of the user,
    acquire information about an aircraft that the user is scheduled to board based on the identification information, and
    performing authentication relating to use of the moving object performed by the user.

* * * * *